United States Patent [19]

Files et al.

[11] 4,109,474
[45] Aug. 29, 1978

[54] BUMPER ASSEMBLY SHOCK CELL SYSTEM

[75] Inventors: James H. Files, New Orleans, La.; John M. Montague, Dallas; Clarence T. Thomerson, Corsicana, both of Tex.

[73] Assignee: Regal Tool & Rubber Co., Inc., Corsicana, Tex.

[21] Appl. No.: 732,653

[22] Filed: Oct. 15, 1976

[51] Int. Cl.² .......................... E02B 3/22; B63B 21/04
[52] U.S. Cl. .......................... 61/48; 114/219; 267/140; 256/1
[58] Field of Search ............... 114/219, 220, 265–267, 114/79 W; 61/48; 267/140; 293/71 R, 88; 256/13.1, 1

[56] References Cited

U.S. PATENT DOCUMENTS

| | | | |
|---|---|---|---|
| 2,644,418 | 7/1953 | Allegro | 114/79 W |
| 3,235,244 | 2/1966 | Hein | 114/219 |
| 3,820,835 | 6/1974 | Wilfert | 293/88 |
| 3,864,922 | 2/1975 | Dial et al. | 114/219 |
| 3,873,076 | 3/1975 | Evans | 114/219 |
| 3,933,111 | 1/1976 | Von Bose et al. | 114/219 |
| 3,991,582 | 11/1976 | Waldrop et al. | 61/48 |
| 3,995,437 | 12/1976 | Drewett | 114/219 |

*Primary Examiner*—Galen L. Barefoot
*Attorney, Agent, or Firm*—Richards, Harris & Medlock

[57] ABSTRACT

A shock cell for a bumper fending off vehicles traveling adjacent a fixed structure is provided wherein an outer cylinder extends horizontally from the structure. An inner cylinder coupled to the bumper extends into the open end of the outer cylinder. An annular rubber cylinder is bonded to the inner surface of the outer cylinder and to the outer surface of the inner cylinder for a distance of the order of the diameter of the inner cylinder and with the outer and inner ends having truncated surfaces conical with reference to apexes outside the outer cylinder and inside said inner cylinder respectively. A shearable stop plate is secured inside the outer cylinder spaced inwardly from the end of the inner cylinder a distance slightly greater than the thickness of the annular body.

6 Claims, 5 Drawing Figures

BUMPER ASSEMBLY SHOCK CELL SYSTEM

FIELD OF THE INVENTION

This invention relates to a bumper support system which fends off boats and barges from stationary marine structures to which the bumpers are attached, and more particularly relates to a resiliently supported shock cell system for attaching bumpers to off-shore platforms, boat landings and the like, to protect them from damage.

BACKGROUND OF THE INVENTION

Offshore platforms which the present invention is designed to protect are semirigid structures subject to damage by excessive shock loading. As drilling progresses to deeper waters in more open seas with the use of heavier supply boats and barges, it has become necessary to develop better protective systems. Such systems are generally attached to individual legs of the offshore platform. In the past, it has been the practice to use cast-off vehicle tires, usually large off-the-road or aircraft tires, mounted on a supporting column next to the platform leg, as shown for instance in Blackman U.S. Pat. No. 2,413,210 or Rolando U.S. Pat. No. 2,952,979, the latter showing the practice of filling the tires with cable or other material to prevent their excessive sagging or collapse. Some special structures have been built for this purpose, as shown for instance in Roach U.S. Pat. No. 3,005,435 and Schwall U.S. Pat. No. 2,424,635. However, each has attendant drawbacks. The cast-off vehicle tire systems involve the difficulty of finding a plurality of tires of the same large size, as well as the problems which arise when corded tires become waterlogged and sag. Moreover, deflated vehicle tires exhibit very poor shock absorption capabilities. Schwall, supra, resorted to making special rubber bumper moldings for this purpose, but such bumpers are mounted in a nonrotating manner and are therefore subject to early destruction. Roach shows rotating cushions, but the use of axles and bearings provides too fragile a structure to withstand open-sea battering.

An improved prior art protective structure has employed a bumper ring array supported on a vertical cylinder and supported at the lower end by a resilient shear mounting and at the upper end by a cylindrical shock cell. By reason of the differences in mounting at the top and bottom supports, unequal energy absorption has been experienced. That is, if a given force is applied distance X from the bottom, the reaction is different from the reaction produced by applying the same force the same distance from the top.

SUMMARY OF THE INVENTION

In accordance with one aspect of the present invention, a vertical pipe column maintains a stack of bumper rings on a common vertical axis and is supported top and bottom by like shock cells preferably with static loads substantially relieved. The pipe column on which the bumper members are mounted is secured top and bottom to shock cells to dissipate major components of the shock applied to a fixed structure, particularly head-on compression forces directed at the structure.

The shock cell includes an outer cylinder extending horizontally from the structure. An inner cylinder is coupled to the bumper and extends into the open end of the outer cylinder. An annular rubber cylinder is bonded to the inner surface of the outer cylinder and to the outer surface of the inner cylinder for a distance of the order of the diameter of the inner cylinder and with the outer and inner ends having truncated surfaces conical with reference to apexes outside the outer cylinder and inside the inner cylinder respectively. A shearable stop plate is secured inside the outer cylinder spaced inwardly from the end of the inner cylinder a distance slightly greater than the thickness of the annular body.

DESCRIPTION OF THE DRAWINGS

The novel features believed characteristic of the invention are set forth in the appended claims. The invention itself, however, as well as further objects and advantages thereof, will best be understood by reference to the following detailed description of illustrative embodiments taken in conjunction with the accompanying drawings, in which:

DESCRIPTION OF THE PREFERRED EMBODIMENT

Figure 1:
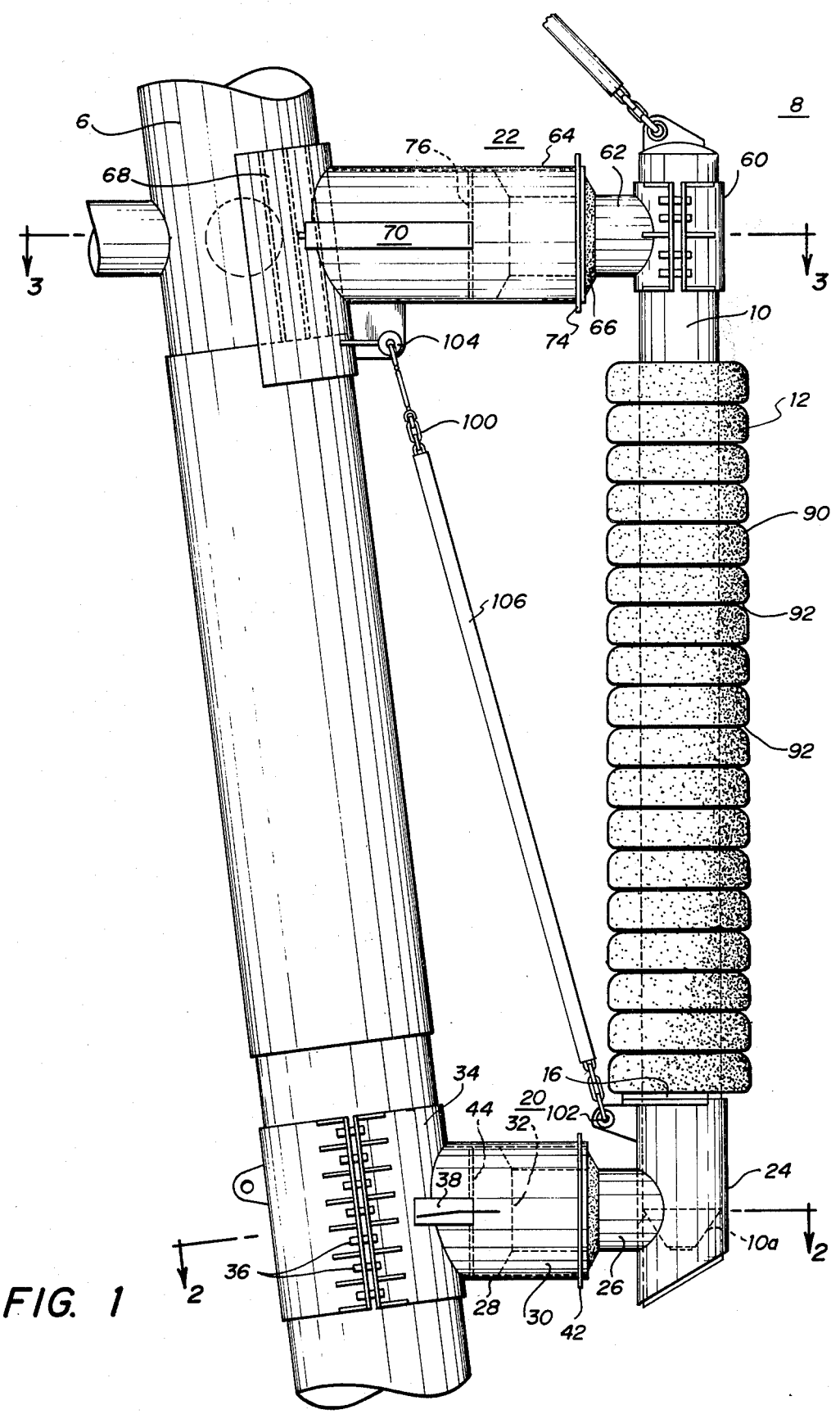
FIG. 1 is an elevation view showing an illustrative embodiment of the bumper system of the present invention.

Referring now to FIG. 1, a leg 6 of an offshore platform (not shown) supports a bumper assembly 8. Bumper assembly 8 includes a pipe column 10 which supports a stacked series of elastomeric cylindrical bumper rings 12 surrounding the column 10 and having inner peripheries loosely fitted thereto so that the rings 12 can freely rotate on the column 10. A lower stop plate 16 supports the bottommost ring and the other rings stacked there above. Column 10 is coupled to the platform leg 6 by two shock cells 20 and 22.

Figure 2:
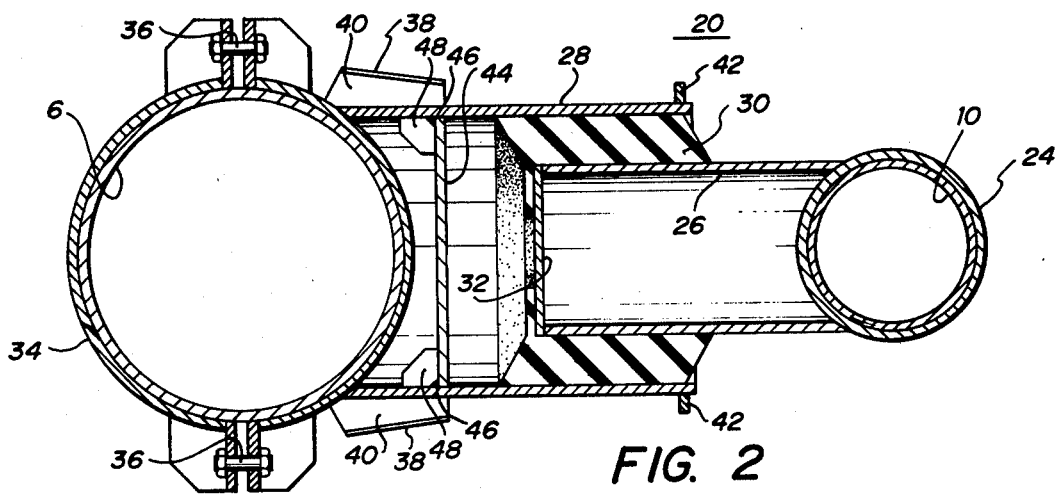
FIG. 2 is a sectional view taken generally along the sectional lines 2—2 of the bumper system of FIG. 1.

Referring to FIGS. 1 and 2, shock cell 20 comprises a short vertical cylinder 24, which is welded to a short horizontal cylinder 26. Cylinder 24 is hollow with the lower end thereof being cut on a taper to slope downwardly and inward towards leg 6. The lower end 10a of pipe column 10 is conical in shape so that it can be stabbed into cylinder 24.

Cylinder 26 is supported by an outer cylinder 28 through a cylindrical rubber body 30, which is adhered to the inner surface of cylinder 28 and the outer surface of cylinder 26. The end of cylinder 26 opposite cylinder 24 is closed by a plate 32.

Cylinder 28 is welded to a split cylinder clamp 34. Clamp 34 encircles and secures the shock cell 20 to the leg 6. The clamp 34 formed in two halves is to be secured to leg 6 by a series of bolts 36. Cylinder clamp 34 is provided lateral rigidity by beams 38 having webs 40 forming a T-bar. Webs 40 are welded to the outer surface of cylinder 28. A reinforcing ring 42 encircles the cylinder 28 at the open end and functions to oppose deflection forces applied to cylinder 26.

A stop plate 44 is secured by a fillet weld 46 around the perimeter of the stop plate 44 at the inner face of the stop plate 44. A plurality of gusset plates 48 are welded to the internal surfaces of cylinder 28 and to the inner face of the stop plate 44 and extend radially inwardly along the face of the stop plate 44 to minimize bending of the stop plate about its inner edges. Stop plate 44 serves to arrest travel of the lower end of the bumper assembly 8 after predetermined travel. It will shear loose in response to unusual forces so that the cylinder 26 can continue its travel and further deflect the shock cell 20.

Figure 3:
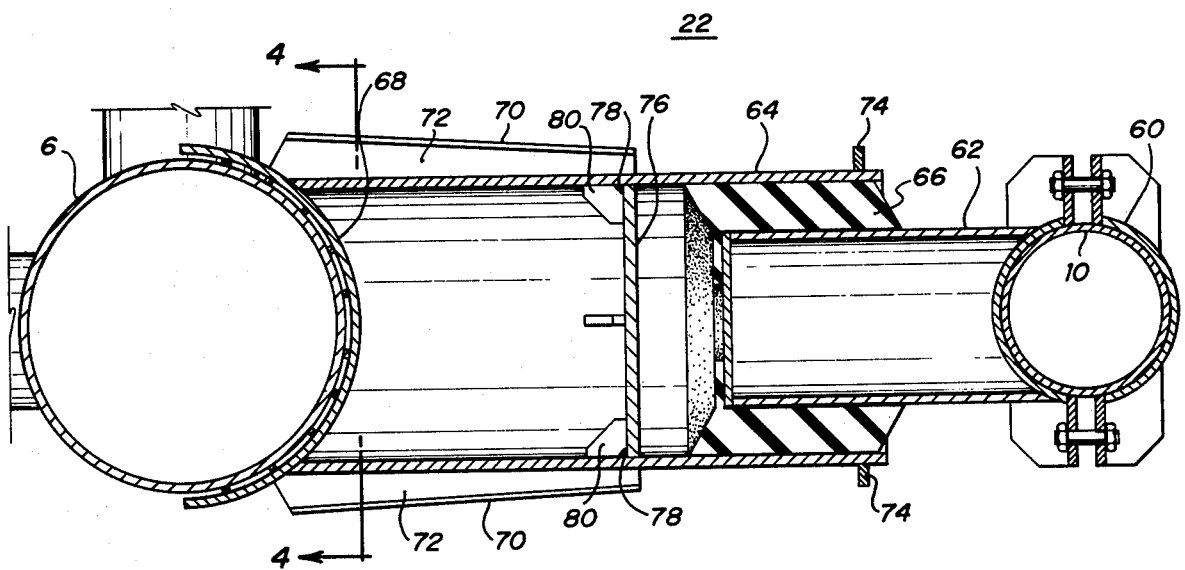
FIG. 3 is a sectional view taken generally along the sectional lines 3—3 of the bumper system of FIG. 1.
Figure 4:
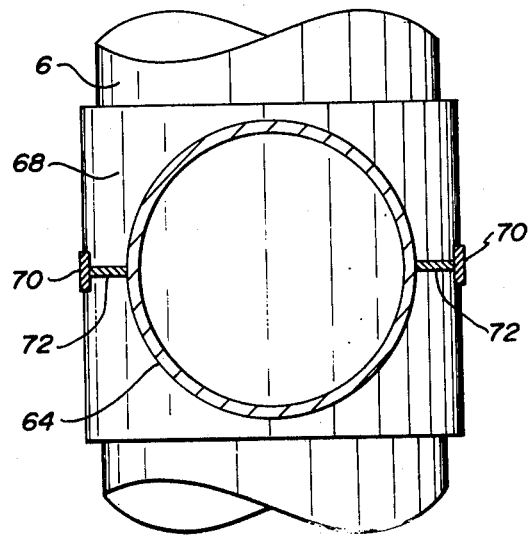
FIG. 4 is a sectional view taken generally along the sectional lines 4—4 of the shock cell of FIG. 3.

Referring to FIGS. 1, 3 and 4, the upper end of column 10 is secured in a split cylinder clamp 60 having an integral cylinder 62 which is supported coaxially in an outer cylinder 64 by a rubber cylinder 66. Rubber cylinder 66 is adhered to the outer surface of cylinder 62 and to the inner surface of cylinder 64. Cylinder 64 is secured to leg 6 by a half cylinder 68, which includes beam 70 and interconnecting web 72. As is more clearly shown in FIG. 4, web 72 extends between beam 70 and the outer surface of cylinder 64 and half cylinder 68. The beam 70 and web 72 form a T-bar which strengthens and secures cylinder 64 to half cylinder 68. Shock cell 22 also includes a reinforcing ring 74 encircling cylinder 64 at its open end. Reinforcing ring 74 performs a similar function as reinforcing ring 42 of shock cell 20, opposing deflection forces applied to cylinder 62.

Shock cell 22 further includes a stop plate 76 which is peripherally welded at 78 to the inside of cylinder 64. Gusset plates 80 are welded to the internal surface of cylinder 64 and to the inner face of stop plate 76. Gusset plates 80 extend radially inwardly along the face of stop plate 76 to minimize bending of stop plate 76 about its inner edges. Stop plate 76 serves the same function as stop plate 44 in shock cell 20.

Shock cells 20 and 22 thus serve to support column 10 and rings 12 in such manner that the reaction of the bumper systems to shock is of symmetrical character because of use of like cells both top and bottom.

The cells will operate under ordinary conditions without damage. Extreme loads will be accommodated without damage to leg 6 by absorption of energy as the shear plates 44 and 76 are stressed or sheared loose.

Thus, by providing like shock cells 20 and 22 both at the bottom and the top of pipe 10, energy absorption will be the same whether the bumper array 12 is contacted by a boat near the upper end or near the lower end. However, while providing this desirable reaction, it is also desirable to avoid maintenance of any substantial static load on shock cells 20 and 22. For this purpose, a tensile bearing support anchor such as a chain 100 or the like, is connected to a lifting eye 102 on the lower end of pipe 10 and extends upwardly at an angle of approximately 15° measured from column 10 where it is secured to an eyelet 104 attached to leg 6. The chain 100 may be covered by a rubber encasement 106. By this means the static loads which would otherwise tend to cause the rubber mountings 30 and 66 to creep are substantially eliminated.

Rings 12 preferably are all alike and comprise an upper end surface 90 relieved in a particular way at the edge. The lower end surface 92 is flat. Rings are placed one above the other to form a cylindrical stack with uniformly spaced annular indentations or grooves. Impact of a boat against the outer surface of a ring causes that ring to tend to rotate with any horizontal movement of the boat other than radially with respect to column 10.

Figure 5:
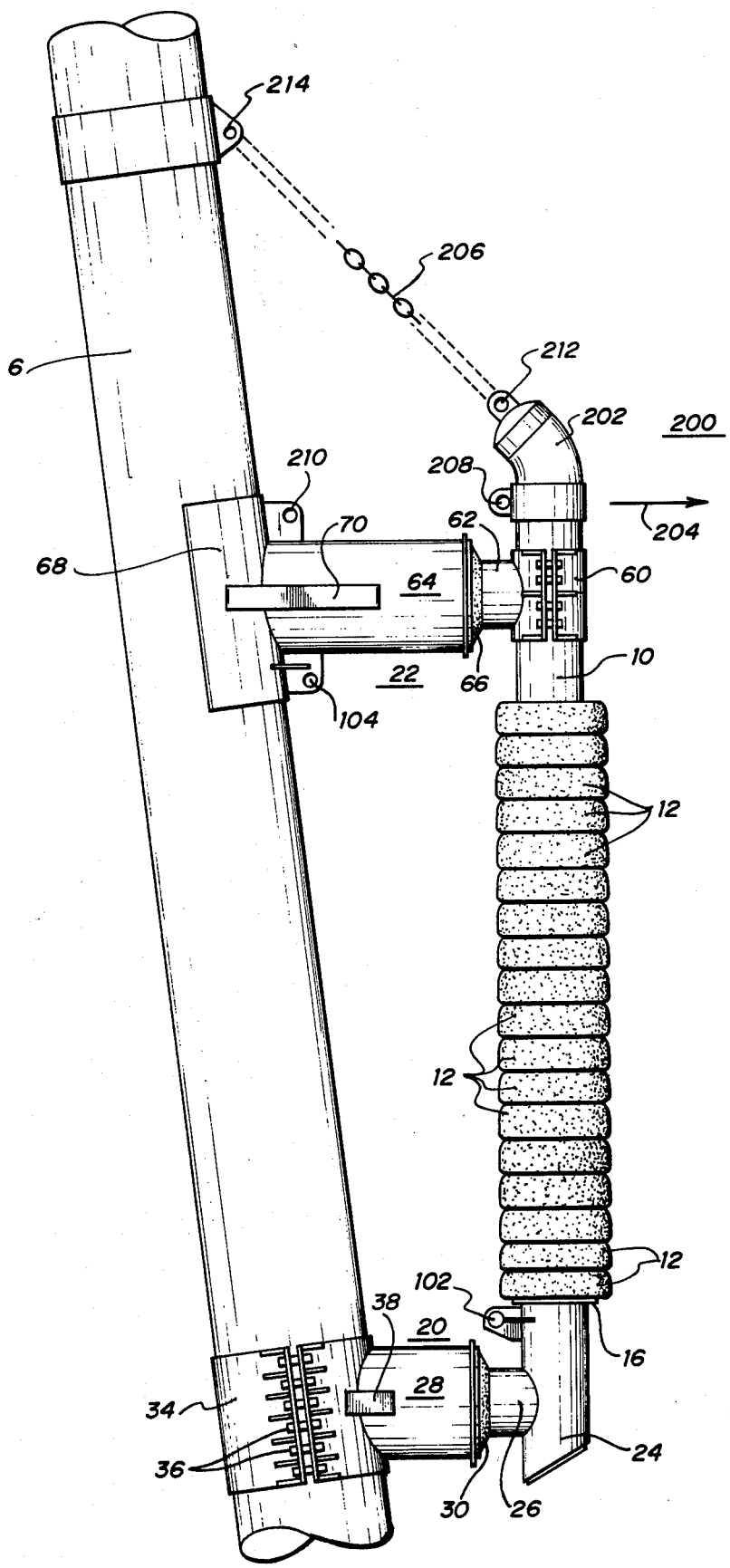
FIG. 5 is an elevation view of a second embodiment of the bumper system of the present invention.

Referring to FIG. 5, a bumper assembly 200 is shown, with like numerals being utilized for like and corresponding parts as in FIGS. 1-4. An elbow 202 extends from the upper end of pipe column 10. Elbow 202 serves to prevent vessels from hanging up upon the top end of pipe column 10. Bumper assembly 200 may be given static support by flexible tension bearing anchor 206. Anchor 206 may comprise a chain similar to chain 100, FIG. 1. Chain 206 is connected to a lifting eye 212 on the upper end of the elbow 212 and extends upwardly at approximately a 45° angle where it is secured to an eyelet 214 attached to leg 6. It functions to relieve the static loads on shock cells 20 and 22 and may be used in place of chain 100.

Alternatively, a chain may be connected to eyelet 208 on the upper end of pipe column 10 and to an eyelet 210 attached to leg 6 to provide opposition to horizontally directed forces represented by arrow 204.

A chain may also be connected to lifting eyelet 102 on the lower end of pipe column 10 and eyelet 104 attached to leg 6. Combinations of chains connected between eyelets 208 and 210, between eyelets 102 and 104 and chain 206 may be used to substantially eliminate the static loads otherwise maintained by shock cells 20 and 22. For example, chain 206 may be used in combination with a chain connected between eyelets 102 and 104, as may a chain connected between eyelets 208 and 210.

Having described the invention in connection with certain specific embodiments thereof, it is to be understood that further modifications may now suggest themselves to those skilled in the art and it is intended to cover such modifications as fall within the scope of the appended claims.

What is claimed is:

1. A shock cell for a bumper for fending off vehicles traveling adjacent a fixed sturcture which comprises:
    (a) an outer cylinder extending from said structure horizontally;
    (b) an inner cylinder coupled to said bumper and extending into the open end of said outer cylinder;
    (c) an annular rubber cylinder bonded to the inner surface of said outer cylinder and to the outer surface of said inner cylinder for a distance of the order of the diameter of said inner cylinder and with the outer and inner ends having truncated surfaces conical with reference to apexes outside said outer cylinder and inside said inner cylinder respectively; and
    (d) a shearable stop plate yieldably secured inside said outer cylinder spaced inwardly from the end of said inner cylinder a distance slightly greater than the thickness of said annular body such that said plate in response to extreme forces being applied to said bumper by the vehicles will shear loose from said outer cylinder to permit travel of said inner cylinder beyond normal limits only in response to said extreme forces.

2. The combination set forth in claim 1 in which a reinforcing ring encircles said outer cylinder at the free end thereof to oppose deflection forces applied to said inner cylinder.

3. The combination set forth in claim 1 in which said outer cylinder is secured to said structure by a cylindrical clamp element whose axis is substantially perpendicular to the axis of said outer cylinder and in which beams having webs lying in the plane of the axis of said outer cylinder are secured to the outer surface of said outer cylinder and to said cylindrical clamping element.

4. The combination set forth in claim 3 in which said beams are in the form of T-shaped bars.

5. A shock cell for a bumper for fending off vehicles traveling adjacent a fixed structure which comprises:

(a) an outer cylinder extending from said structure horizontally;
(b) an inner cylinder coupled to said bumper and extending into the open end of said outer cylinder;
(c) an annular rubber cylinder bonded to the inner surface of said outer cylinder and to the outer surface of said inner cylinder for a distance of the order of the diameter of said inner cylinder and with the outer and inner ends having truncated surfaces conical with reference to apexes outside said outer cylinder and inside said inner cylinder respectively;
(d) a shearable stop plate yieldably secured inside said outer cylinder spaced inwardly from the end of said inner cylinder a distance slightly greater than the thickness of said annular body such that said plate in response to extreme forces being applied to said bumper by the vehicles will shear loose from said outer cylinder to permit over travel of said inner cylinder in response to said extreme forces;
(e) a reinforcing ring encircling said outer cylinder at the free end thereof to oppose deflection forces applied to said inner cylinder; and
(f) a plurality of gusset plates welded to the internal surface of said outer cylinder and to the inner face of said stop plate and extending radially inwardly along the face of said stop plate to minimize bending of said stop plate about the inner edge of said stop plate.

6. A shock cell for a bumper for fending off vehicles traveling adjacent a fixed structure which comprises:

(a) an outer cylinder extending from said structure horizontally;
(b) an inner cylinder coupled to said bumper and extending into the open end of said outer cylinder;
(c) an annular rubber cylinder bonded to the inner surface of said outer cylinder and to the outer surface of said inner cylinder for a distance of the order of the diameter of said inner cylinder and with the outer and inner ends having truncated surfaces conical with reference to apexes outside said outer cylinder and inside said inner cylinder respectively;
(d) a shearable stop plate yieldably secured inside said outer cylinder spaced inwardly from the end of said inner cylinder a distance slightly greater than the thickness of said annular body such that said plate in response to extreme forces being applied to said bumper by the vehicles will shear loose from said outer cylinder to permit over travel of said inner cylinder in response to said extreme forces;
(e) a reinforcing ring encircling said outer cylinder at the free end thereof to oppose deflection forces applied to said inner cylinder;
(f) a plurality of gusset plates welded to the internal surface of said outer cylinder and to the inner face of said stop plate and extending radially inwardly along the face of said stop plate to minimize bending of said stop plate about the inner edge of said stop plate; and
(g) said stop plate being secured by a fillet weld around the perimeter of said stop plate at the inner face thereof.

* * * * *